(12) United States Patent
Hotchkies et al.

(10) Patent No.: US 9,299,030 B1
(45) Date of Patent: Mar. 29, 2016

(54) PREDICTIVE PAGE LOADING BASED ON NAVIGATION

(75) Inventors: Blair L. Hotchkies, Bellevue, WA (US); Michael L. Brundage, Kirkland, WA (US); Pongsakorn Teeraparpwong, Bellevue, WA (US); Jason P. Patrikios, Seattle, WA (US); Sarah E. Williams, Seattle, WA (US); Brent Robert Mills, Seattle, WA (US); Alexandru I. Indrei, Seattle, WA (US); Daniel R. Parshall, Redmond, WA (US); John M. Nilles, Poulsbo, WA (US); Sikandar Saifullah, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 332 days.

(21) Appl. No.: 13/037,829

(22) Filed: Mar. 1, 2011

(51) Int. Cl.
G06F 9/44 (2006.01)
G06N 7/02 (2006.01)
G06N 7/06 (2006.01)
G06N 5/04 (2006.01)
G06F 17/30 (2006.01)

(52) U.S. Cl.
CPC .......... *G06N 5/046* (2013.01); *G06F 17/30864* (2013.01)

(58) Field of Classification Search
USPC .......................................................... 706/52
See application file for complete search history.

(56) References Cited

U.S. PATENT DOCUMENTS

| | | | |
|---|---|---|---|
| 5,873,076 A | 2/1999 | Barr et al. | |
| 6,023,726 A * | 2/2000 | Saksena | 709/219 |
| 6,029,195 A * | 2/2000 | Herz | 725/116 |
| 6,085,226 A | 7/2000 | Horvitz | |
| 6,182,133 B1 | 1/2001 | Horvitz | |
| 6,237,039 B1 | 5/2001 | Perlman | |
| 7,010,537 B2 | 3/2006 | Eyal et al. | |
| 7,415,517 B1 | 8/2008 | Schleit et al. | |
| 7,475,089 B1 | 1/2009 | Geddes | |
| 7,499,940 B1 | 3/2009 | Gibbs | |
| 7,617,202 B2 | 11/2009 | Brill et al. | |
| 7,725,501 B1 | 5/2010 | Stillman et al. | |
| 7,747,749 B1 | 6/2010 | Erikson et al. | |
| 7,757,298 B2 | 7/2010 | Shuster | |
| 7,836,044 B2 | 11/2010 | Kamvar et al. | |

(Continued)

OTHER PUBLICATIONS

Khan, Javed and Qingping Tao "Partial Prefetch for Faster Surfing in Composite Hypermedia" 2001 [Online] Downloaded Mar. 7, 2013 http://131.106.3.253/publications/library/proceedings/usits01/full_papers/khan/khan.pdf.*

(Continued)

*Primary Examiner* — Ben Rifkin
(74) *Attorney, Agent, or Firm* — Thomas | Horstemeyer, LLP

(57) ABSTRACT

Disclosed are various embodiments for predictive network page loading. Content corresponding to a network request is obtained. A next network page associated with the obtained page content is predicted. If the prediction is confident relative to a predetermined confidence threshold, then a first network page is generated. The first network page includes the page content corresponding to the network request and a portion of content for the predicted network page. The generated first network page is provided to a client. A request for another network page is received. If the another network page in the request corresponds to the predicted next network page, a second network page is generated. The second network page includes the remainder of the content for the predicted page content.

21 Claims, 8 Drawing Sheets

(56) References Cited

U.S. PATENT DOCUMENTS

| | | | |
|---|---|---|---|
| 8,112,409 | B2 | 2/2012 | Shen et al. |
| 8,230,046 | B2 | 7/2012 | Jiang |
| 2002/0010634 | A1 | 1/2002 | Roman et al. |
| 2002/0023084 | A1 | 2/2002 | Eyal et al. |
| 2003/0233246 | A1 | 12/2003 | Snapp et al. |
| 2004/0133564 | A1 | 7/2004 | Gross et al. |
| 2005/0149576 | A1* | 7/2005 | Marmaros et al. ............ 707/200 |
| 2005/0228795 | A1 | 10/2005 | Shuster |
| 2005/0268046 | A1* | 12/2005 | Heil .............................. 711/137 |
| 2006/0047775 | A1 | 3/2006 | Bruck et al. |
| 2006/0070012 | A1* | 3/2006 | Milener et al. ................ 715/822 |
| 2006/0080292 | A1 | 4/2006 | Alanzi |
| 2007/0050339 | A1 | 3/2007 | Kasperski et al. |
| 2007/0088681 | A1 | 4/2007 | Aravamudan et al. |
| 2007/0124446 | A1 | 5/2007 | Coulthard et al. |
| 2007/0255619 | A1 | 11/2007 | Ekchian |
| 2008/0016218 | A1 | 1/2008 | Jones et al. |
| 2008/0235594 | A1 | 9/2008 | Bhumkar et al. |
| 2010/0088398 | A1 | 4/2010 | Plamondon |
| 2010/0162126 | A1 | 6/2010 | Donaldson et al. |
| 2010/0169137 | A1 | 7/2010 | Jastrebski et al. |
| 2011/0145321 | A1 | 6/2011 | Jiang |
| 2012/0089899 | A1 | 4/2012 | Palaima et al. |

OTHER PUBLICATIONS

Search Results—IP.com, retrieved from https://ip.com/search/results.html, Mar. 19, 2014.
Derkeiler.com "Refund Dilema—Opinions needed", http:/newsgroup.derkeiler.com/Archive/Alt/alt.marketing.online.edu.ebay/2005-10/msg02945.html, Oct. 22, 2005.
Roadracing World Publishing "Yamaha Offers to Buy Back YZF-R6 Streetbikes Over Redline Claims", Feb. 14, 2006, Roadracing World Publishing, Inc., http:/roadracingworld.com/news/article/?=25009.
Jennings, T., & Baker, D. Application Express Application Builder User's Guide (Sep. 2010),. Retrieved May 14, 2014 from http://docs.oracle.com/cd/E17556_01/welcome.html. (Uploaded to PTO as Part 1 and Part 2).

* cited by examiner

PREDICTIVE PAGE LOADING BASED ON NAVIGATION

BACKGROUND

Online shoppers interact with product search engines to find products of interest and obtain information about those products. The product search engine returns summary information for products that most closely match a user's search query. When the number of such products is relatively large, the search results may be divided into multiple pages, and the user navigates from one page to the next to view all the products. The entire web site is also divided into multiple pages, and the user navigates from one network page to another by performing searches, clicking links, and interacting with other website and browser controls.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to transitioning between pages of search results or other website content within a series of multiple pages. Using data describing past user behavior in transitioning from one page to another, a prediction is made of the next page in the series that is likely to be viewed by a user. The first portion of the content on this predicted next page is downloaded to the browser before the user selects the next page, and rendered in a hidden portion of the browser window. When the user does view the predicted page, the pre-fetched content is made visible and the browser downloads the remainder of the page.

Figure 1:
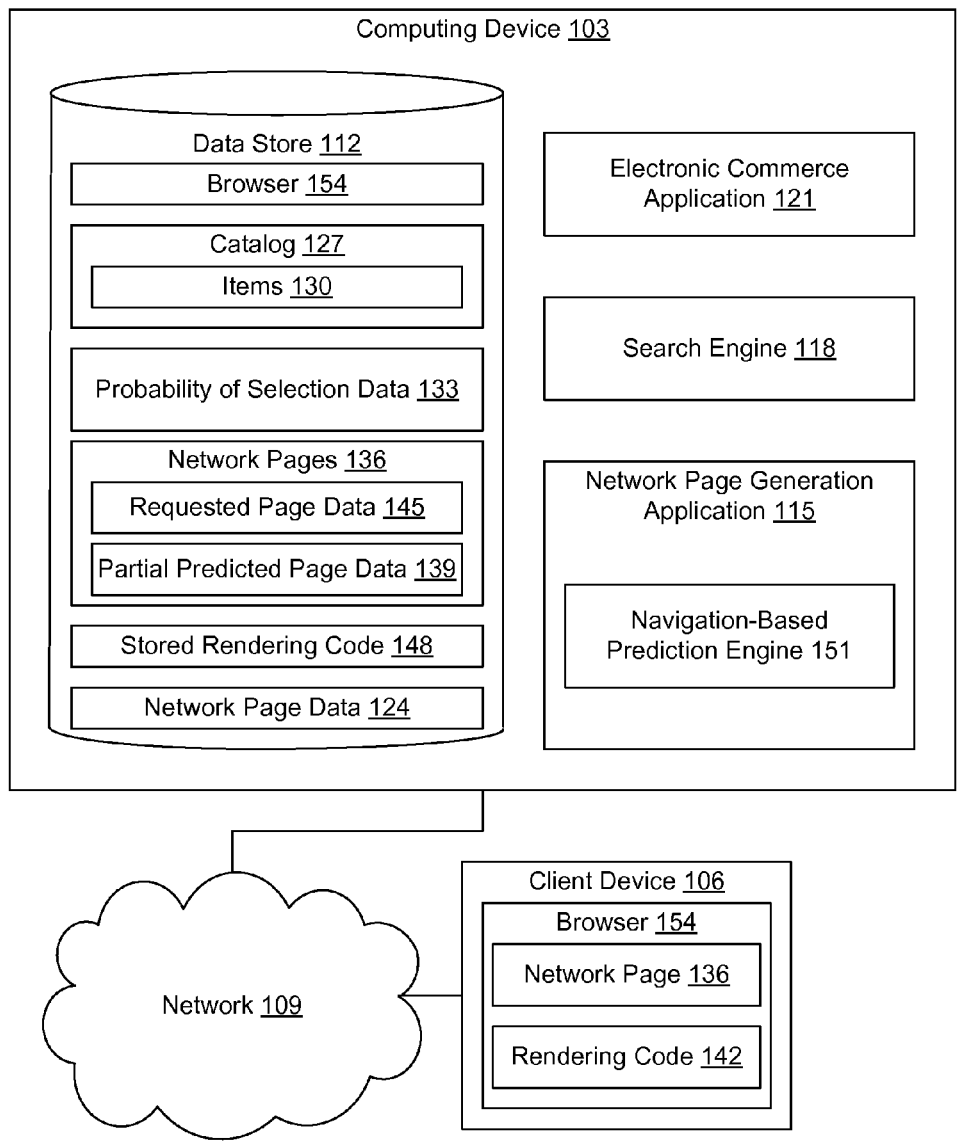
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a network page generation application 115 and a search engine 118. In some embodiments, the computing device 103 also includes an electronic commerce application 121 The components executed on the computing device 103 may also include other applications, services, processes, systems, engines, or functionality not discussed in detail herein. These components may communicate with each other using various mechanisms, including but not limited to any type of middleware framework. Though shown as logically separate components, the functionality of the network page generation application 115, the navigation-based prediction engine 151, and the search engine 118 can be combined and/or distributed in various ways, as can be appreciated.

The data stored in the data store 112 includes, for example, network page data 124, rendering code 142, a catalog 127 of items 130, probability of selection data 133, and potentially other data. As used herein, the term "item" 130 may refer to a product, good, service, software download, multimedia download, social networking profile, or other item 130 that may be offered for sale, purchase, rental, lease, download, and/or any other form of consumption, as may be appreciated. Associated with items 130 and stored in catalog 127 are data such as titles, descriptions, keywords, metadata, weights, customer reviews, multimedia, and other data relating to the items 130.

The optional electronic commerce application 121, if present, is executed in order to facilitate the online viewing and/or purchase of items and products over the network 109. The electronic commerce application 121 also performs various backend functions associated with the online presence of a merchant in order to facilitate the online purchase of items, as should be appreciated. In embodiments which include the electronic commerce application 121, the catalog of items comprises a product catalog of items offered for sale, so that data associated with items 130 comprises product data.

The search engine 118 is executed to find items 130 in the catalog 127 using a search query. To provide content in response to user queries, content associated with item(s) retrieved by a query may be retrieved from the catalog data and encoded for display in a client device 106 by the network page generation application 115.

The network page generation application 115 is thus executed to generate network pages 136 that describe items. To this end, the network page generation application 115 uses network page data 124, which may include any type of data related to the generation of network pages 136. Such data may include, for example, templates, executable code, interpreted code, hypertext markup language (HTML), extensible markup language (XML), images, video, text, graphics, and any other type of data that may be used in network pages 136.

The network page generation application 115 may include a network page server and/or other components. The network page server may comprise a commercially available hypertext transfer protocol (HTTP) server such as, for example, Apache® HTTP Server, Microsoft® Internet Information Services (IIS), and other servers.

Some network pages 136 generated by the network page generation application 115 may include references to a series of pages. For example, when a search query produces a list of results that includes a large number of items, the search results may be broken up into a series of pages, each referencing one or more of the other pages. When a generated network page 136 includes references to a series of pages, the network page generation application 115 may also add information about a predicted page within the series to the generated network page 136. Thus, the network page 136 may include partial predicted page data 139 and rendering code 142 as well as the requested page data 145. The combination of the partial predicted page data 139 and the rendering code 142 stored on the same network page 136 as the requested page data 145 allows the client device 106 to pre-load and to render more quickly a portion of a predicted network page which the user is deemed likely to visit, as will be described below. In some embodiments, the partial predicted page data 139 corresponds to the portion of the predicted network page 136 that is first seen by the user, a region sometimes referred to as "above the fold."

The network page generation application 115 may be configured to generate the rendering code 142 for a specific network page 136 and/or client device 106 based on stored rendering code 148 in the data store 112. The specific rendering code 142 and the stored rendering code 148 may include, for example, Javascript, dynamic HTML (DHTML), Ajax, and any other type of code that may be executed in a client device 106 from within a network page 136. The specific rendering code 142 and the stored rendering code 148 may also include asynchronous exchange of data with the network page generation application 115, the navigation-based prediction engine 151, the search engine 118, or other applications using Ajax, simple object access protocol (SOAP), remote procedure call (RPC), and/or other technologies.

As mentioned above, the network page generation application 115 may improve rendering by including partial predicted page data 139 along with the requested page data 145. A navigation-based prediction engine 151 is used to select the predicted page. The navigation-based prediction engine 151 predicts which network page a user is most likely to access next by using probability of selection data 133 stored in the data store 112. The probability of selection data 133 indicates the most likely object or link that will be clicked on a specific network page. More generally, the probability of selection data 133 indicates the most likely customer action taken with respect to a specific network page. The page probability of selection data 133 may be derived, for example, from historical user data collected by a search profiling service or another application based on previous search queries, page view data, and/or other data. The probability of selection data 133 may be indexed for a particular user, or may be aggregated across users.

The probability of selection data 133 thus includes information that describes user behavior in navigating from one network page to another within a network site such as a web site. One example of navigation is moving between pages in a series of pages, and thus the page transition probability data 133 may include various probabilities for a user viewing one page in a multi-page series after viewing other page(s) in the series. For example, the probability of selection data 133 may include the probability of viewing the second page of a search results list after viewing the first page of the list, the probability of viewing the second and third pages after viewing the first page, the probability of viewing the third page after viewing the first page, and other such probabilities. Other examples of probability of selection data 133 include the probability that a user will select the very first item in a search result; and that a user will select a particular category choice in a navigation pane. The probability of selection data 133 may contain a non-zero probability for more than one prediction. For example, there may be a 80% probability that the user is likely to view the second page after the first, and a 40% probability that the user is likely to view the third page after the first. The navigation-based prediction engine 151 may select the page with the highest probability as the predicted page.

The navigation-based prediction engine 151 may use a confidence threshold in making a prediction. In such embodiments, if the probability associated with the predicted page does not exceed the threshold, the network page generation application 115 does not include partial predicted page data 139 when generating the page. Otherwise, the prediction is considered to be confident enough for the network page generation application 115 to include partial predicted page data 139 as well as the requested page data 145. It may be useful to take confidence into account because pre-loading the next page incurs some amount of resources, and incurring that cost may not be a wise trade-off if the probability of a correct prediction is low.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 154 and other applications. The browser 154 may be executed in a client device 106, for example, to access and render network pages 136 or other network content served up by the network page generation application 115, thereby generating a rendered network page. The client device 106 may be configured to execute applications beyond the browser 154 such as, for example, email applications, instant message applications, and/or other applications.

Figure 2:
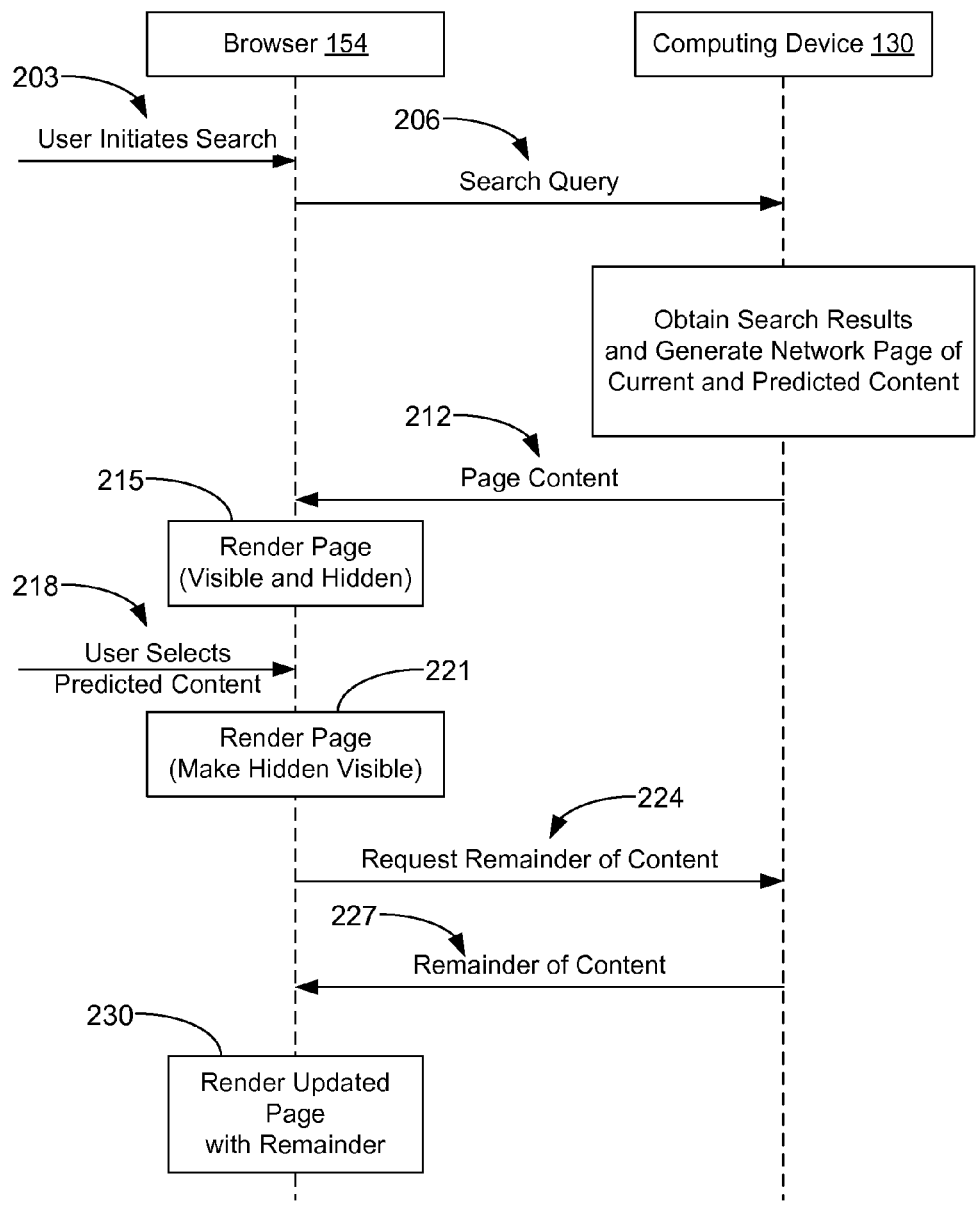
FIG. 2 is a block diagram illustrating various interactions between some of the components in the networked environment of FIG. 1 according to various embodiments of the present disclosure.

Turning to FIG. 2, a general description of the operation of the various components of the networked environment 100 is provided. To begin, at event 203 a user at a client device 106 interacts with the browser 154 to initiate a search of the catalog 127. The search may be, for example, based on keywords. As a result of the user interaction, at event 206 the browser 154 sends a network request to the computing device 103 over the network 109 (FIG. 1). This network request may take the form of a search query, but may also include other types of requests, such as a request for a network resource such as a network page. Examples of such requested network pages include a category page and a product detail page.

At block 209, the computing device 103 obtains content matching the network request and generates a network page 136 which includes this page content. At block 212, the computing device 103 sends the network page 136 to the client device 106 over the network 109. As described above, rendering code 142 and partial predicted page data 139 may be included on the page along with the requested page data 145.

At block 215, the network page 136 is processed and rendered by the browser 154. During this processing, the rendering code 142 on the network page 136 executes on the client device 106 to render the requested page data 145 in the visible portion of the browser 154 while rendering the partial predicted page data 139 in a hidden portion of the browser 154.

At event 218, the user takes an action which results in a request to view the predicted (and partially pre-fetched) network page 136, for example, requesting the second page of search results. In response, at block 221 the rendering code 142 on the network page 136 retrieved earlier at block 209 executes to make the hidden partial predicted page data 139 visible in the browser 154.

At block 224, the rendering code 142 requests the remaining portion of the predicted network page 136 from the network page generation application 115, and at block 227, the network page generation application provides the remaining portion. While block 221 (partial render) is shown before block 224 (download remainder), the order can also be reversed, or the two actions can run substantially concurrently.

At block 230, the remainder of the predicted network page 136 has finished downloading and the rendering code 142 renders an updated view of the predicted network page 136. In some embodiments, the updated view makes the entire new network page 136 visible. In other embodiments, the updated view includes an element such as a viewport, scroll bar, etc., which allows the user to take action to make the remainder visible. As described above, the user does not see the partial page content until the user action views the predicted network page 136. The browser embodiment described in connection with FIG. 2 accomplished this by rendering the partial predicted page content in a hidden portion of the browser window. Other browser embodiments accomplish this by locally storing the partial predicted page content when it is returned from the computing device 103, but delaying the display of the partial predicted page content until a user action causes the predicted network page 136 to be accessed.

In this manner, the user experience is enhanced by making a prediction about which page(s) the user will request next and pre-fetching those page(s), since the new pages can be rendered when the user requests the pages. Without this prediction, the download of the next network page 136 would be delayed until the user took action to specifically request the next network page 136 (e.g., by selecting "Next Page"). In some embodiments, this prediction mechanism is used repeatedly. To this end, when returning the remainder of a previously predicted page to the browser 154, the page generation application 115 may also include partial data for another predicted page. The navigation-based prediction engine 151 is used to obtain this subsequent prediction, using the prediction techniques described herein. The process of block 227 is thus analogous to the process of block 213. The page generation application 115 may decide on a page-by-page basis whether to include page data for a subsequent prediction along with the remainder data for the previous prediction. In some embodiments, the browser request at block 224 does not specifically encode a request for the remainder, but may instead generically encode a request for another network page. In this case, the network page generation application 115 uses stored context to determine that the requested page should include another prediction.

As described above, the user does not see the predicted page content until the user takes action to actually access the predicted page, i.e., until the prediction is a hit rather than a miss. The browser embodiment described in connection with FIG. 2 accomplished this by rendering the partial predicted page content in a hidden portion of the browser window. Other browser embodiments accomplish this by locally storing the partial predicted page content when it is returned from the computing device 103, but delaying the display of the partial predicted page content until a user action causes predicted page to be accessed. The operation of the rendering code 142 will now be described in the context of examples of network pages 136 that are rendered in a browser 154.

FIGS. 3A-D illustrate examples of a network page 136, denoted herein as 136a, 136b, 136c, and 136d, rendered by a browser 154 executing in client device 106 in the networked environment 100. As noted above, the network page 136 includes page content that is generated by the network page generation application 115. Such page content may include search results, and FIGS. 3A-D illustrate various stages of results from a search query of "white t-shirts." In this example, the search results include a total of 15 results, and five items are shown on each page of search results.

Figure 3A:
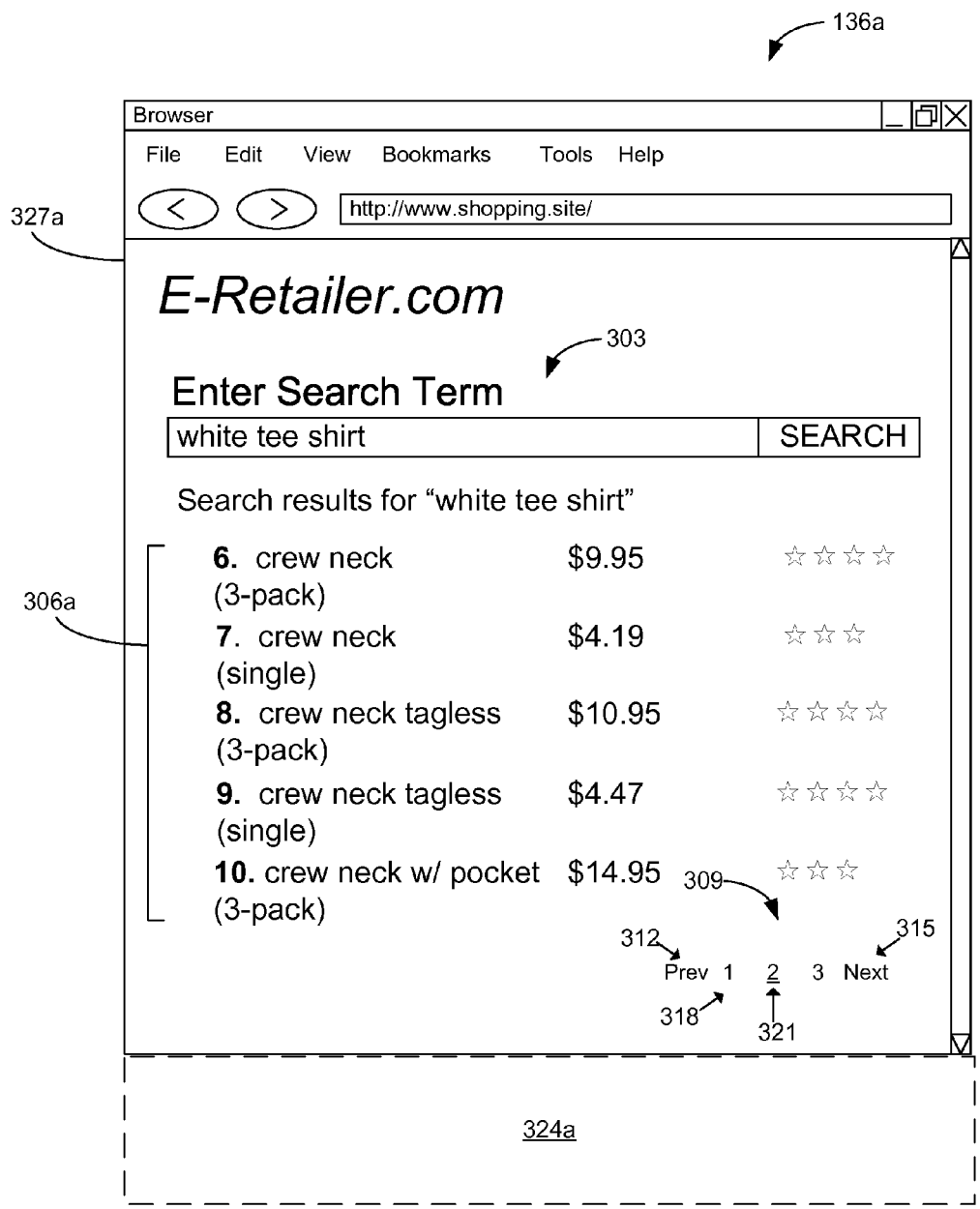
FIGS. 3A-C are drawings of examples of a network page rendered by a client device in the networked environment of FIG. 1 according to various embodiments of the present disclosure.

Referring to FIG. 3A, the network page 136a includes a search query component 303 and a list of search results 306a. The network page 136a also includes a pagination component 309. The pagination component 309 includes various options which allow the user to move from one page of search results to another, viewing a partial list each time. The pagination component 309 includes a previous page option 312, a next page option 315, and one or more specific page options 318. The search results list 306 includes items 5-10. The pagination component 309 also includes a current page indicator 321 which indicates that this is the second page.

The rendered network page 136a further includes the partial predicted page data 139, which represents a portion of the third page of the search results. As described earlier, this page is selected based on a prediction of which page the user is likely to view next. In other words, the retrieval of data for the predicted page occurs before, and is independent of, the user action which actually requests the page. Since the user has not yet requested the third page, this predicted data is stored in a hidden portion 324a of the network page 136a, and is not visible in the browser 154. In contrast, the search query component 303, the search results list 306a, and the pagination component 309 appear in a visible portion 327a of the network page 136a, which is visible in the browser 154.

Figure 3B:

Moving on to FIG. 3B, shown is the network page 136b, which is rendered in response to a user interacting with the pagination component 309 to request the next page in the series of search results, the third page. In this example, the user has selected the third page, which could occur by selecting the specific page option 318 for the third page, or by selecting the next page option 315 since the user was viewing the second page in FIG. 2A. The rendering code 142 uses the partial predicted page data 139 to display the first three items in the search results list 306b in the visible portion 327b. Since these three items were obtained before the user selected the third page and hidden, they are made visible without a delay while the remainder of the third page is retrieved as described above in connection with FIG. 2. While three items were pre-loaded in this particular example, the number of pre-loaded items may vary, as should be appreciated.

Figure 3C:
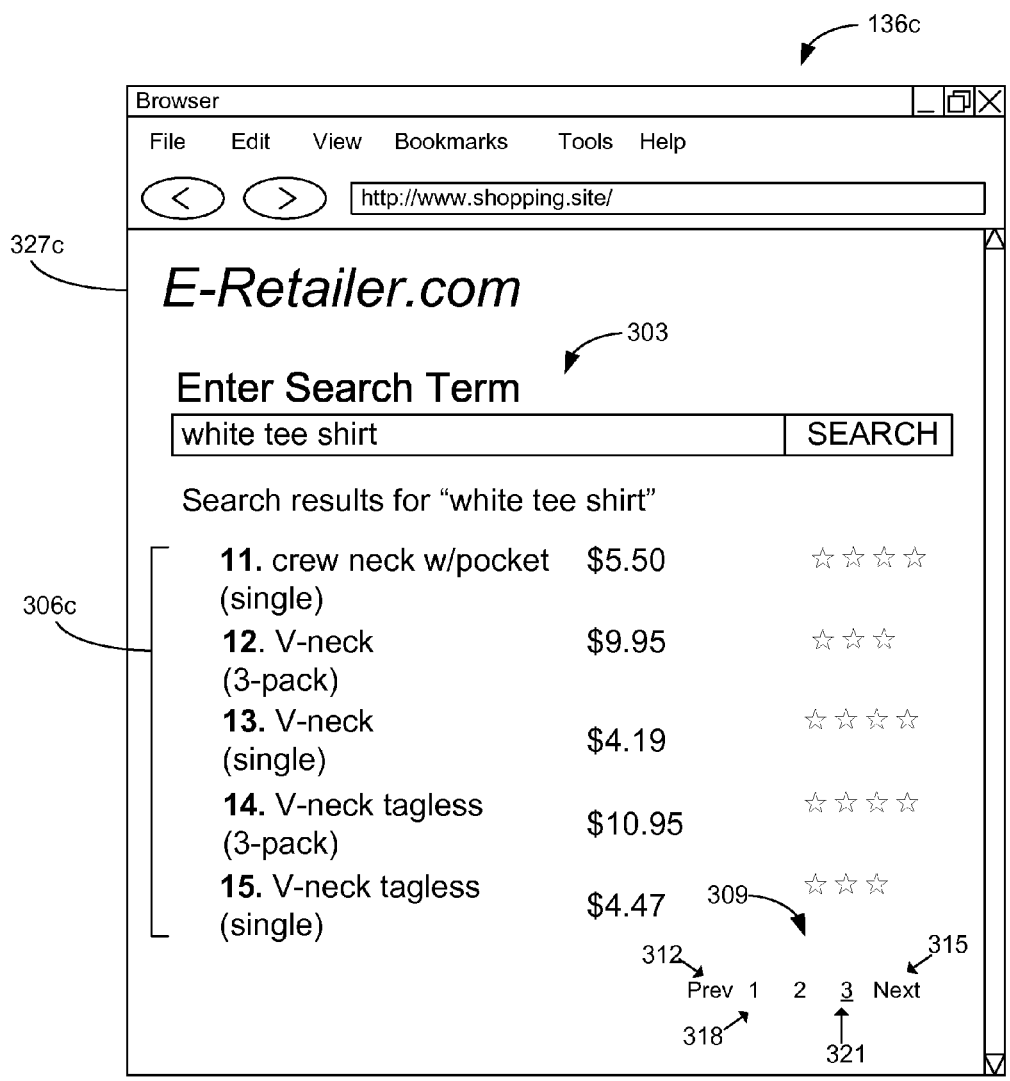

Turning now to FIG. 3C, shown is another network page 136c which is rendered by the rendering code 142 when the download of the predicted page is complete. All five items of the third page are now visible in the search results list 306c.

In the embodiment described above, rendering of the partial predicted page data 139 in the visible portion 327 is triggered by the user selecting the predicted page. In another embodiment (not shown), viewability of the visible portion 327b is controlled through a scroll bar or viewport control, and rendering of the partial predicted page data 139 is instead triggered by the user scrolling down to reveal the previously hidden portion of the viewport.

Figure 4:
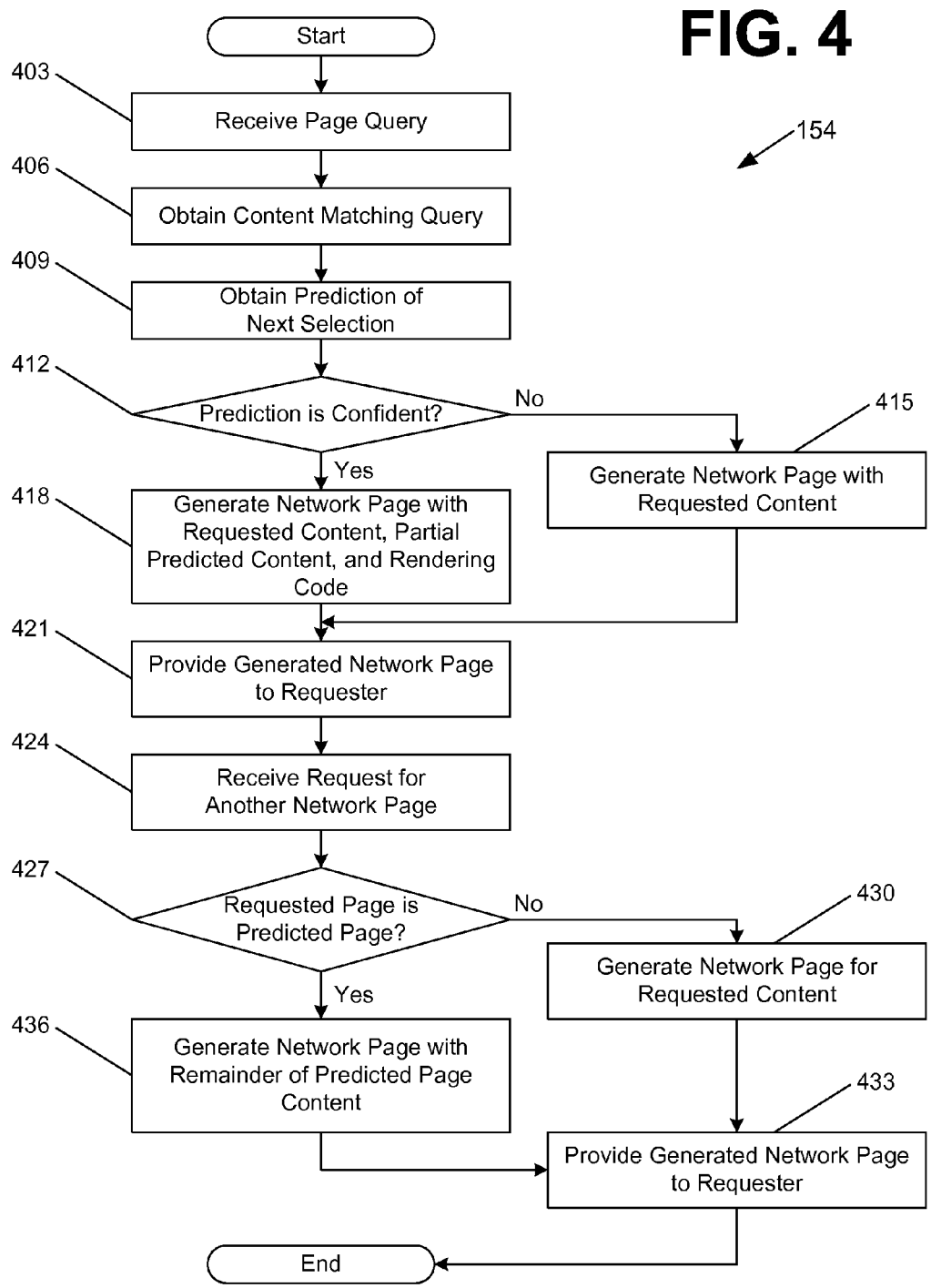
FIG. 4 is a flowchart illustrating an example of functionality implemented as portions of a network page generation application executed in a computing device in the networked environment of FIG. 1 according to various embodiments of the present disclosure.

Having described the overall process of using navigation-based prediction to generate a network page 136 which includes additional pre-fetched results, the operation of the server side and client side components will now be described in more detail, starting with the server side. Turning now to FIG. 4, shown is a flowchart that provides one example of the operation of a portion of the network page generation application 115 (FIG. 1) according to various embodiments. It is understood that the flowchart of FIG. 4 provides merely an example of the many different types of functional arrangements that may be employed to implement the operation of the portion of the network page generation application 115 as described herein. As an alternative, the flowchart of FIG. 4 may be viewed as depicting an example of steps of a method implemented in the computing device 103 (FIG. 1) according to one or more embodiments.

Beginning at box 403, the network page generation application 115 receives a network request from a browser 154. Next, at box 406 the network page generation application 115 obtains page content matching the request. If the network request is a search query, this may be accomplished by passing the query on to the search query component 303. This page content may be identified by a handle, and this handle may be used later to further refine the search results. For example, the network page generation application 115 may pass the handle to the search query component 303 along with a request to select specific rows (items) of the result set in order to obtain other pages in the search results.

At box 409, the network page generation application 115 obtains a prediction for requested content, i.e., a prediction of which network page the user will navigate to next. At box 412, the network page generation application 115 determines whether the prediction is confident enough to be useful, by comparing it to a threshold. If at box 412 it is determined that the prediction is not confident enough to be used, then at box 415 the network page generation application 115 generates a network page 136 containing the initial page of the requested content, as requested page data 145. However, the generated network page 136 does not include partial predicted page data 139 or rendering code 142 in this instance.

If at box 412 it is determined that the prediction is confident enough to be used, then at box 418 the network page generation application 115 generates a network page 136 containing the requested content, as requested page data 145. The network page generation application 115 also adds partial predicted page data 139 to the page, as well as rendering code 142 which causes the client render the partial predicted page data 139 as described above.

Having generated the network page 136 at either block 412 or box 415, processing continues at block 421, where the generated network page 136 is provided to the browser 154. At block 424, the network page generation application 115 receives a request from the browser 154 for another network page, as a result of the user interacting with objects or links on the displayed network page 136.

At block 427, the network page generation application 115 uses state stored in blocks 406 through 418 to determine whether the requested page network is the predicted network page. If the network page requested in box 424 is not the predicted network page, then processing continues at block 430. At block 430, where a network page 136 is generated to include the requested network page. However, since the request network page is not the predicted network page, partial search results are not included or pre-fetched. The generated network page 136 is provided to the browser 154 at block 433, and the process of FIG. 4 is then complete. In some embodiments, block 430 may involve retrieving the requested page of search results from the search engine 118, while in other embodiments the request is fulfilled from a local cache.

If it is determined at block 427 that the network page requested at block 424 is the predicted network page, then processing continues at block 436. At block 436 the network page generation application 115 generates a network page that includes the remainder of the previously requested page content, excluding the first portion which was already provided as pre-fetched results. As noted above in connection with FIG. 2, this prediction mechanism may be used not only for an initially requested page, but repeatedly, in which case the page generation application 115 may also include partial data for another predicted page when returning the remainder of a previously predicted page. In some embodiments, the network page generation application 115 may request the next page from the search engine 118. In some embodiments, the network page generation application 115 caches internally the search results obtained at block 406, and uses the locally stored search results to fulfill the request. The generated network page 136 is provided to the browser 154 at block 433, and the process of FIG. 4 is then complete.

Figure 5:
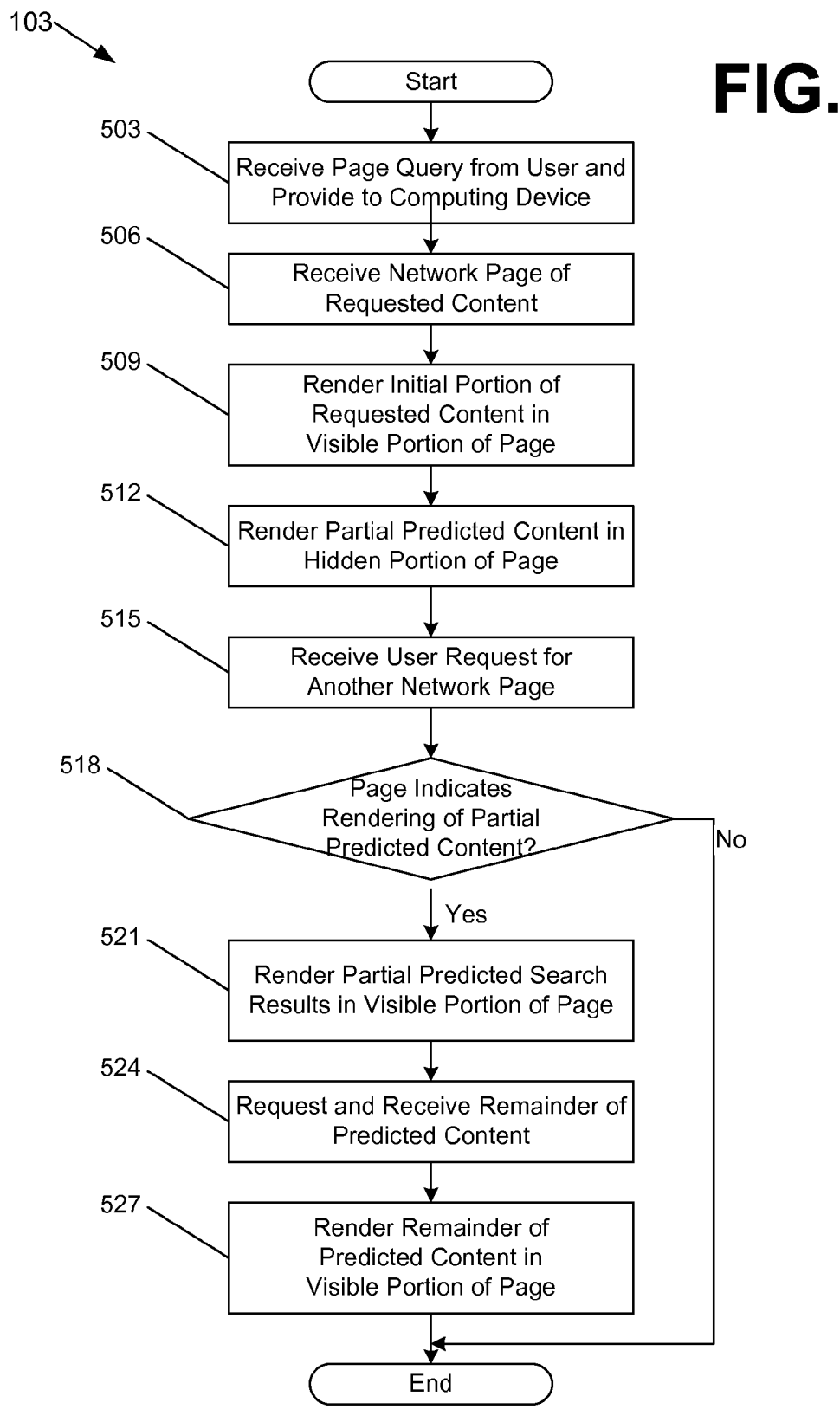
FIG. 5 is a flowchart illustrating an example of functionality implemented as portions of a browser executed in a client computing device in the networked environment of FIG. 1 according to various embodiments of the present disclosure.

Having described the server side of the navigation-based prediction to generate pre-fetched results, the client side of the process will now be described in more detail. With reference now to FIG. 5, shown is a flowchart that provides one example of the operation of a portion of the browser 154 (FIG. 1) according to various embodiments. It is understood that the flowchart of FIG. 5 provides merely an example of the many different types of functional arrangements that may be employed to implement the operation of the portion of the browser 154 as described herein. As an alternative, the flowchart of FIG. 5 may be viewed as depicting an example of steps of a method implemented in the browser 154 (FIG. 1) according to one or more embodiments.

Beginning at box 503, a user-initiated network request is received in the browser 154 and the browser 154 provides the network request to a computing device 103. Next, at box 506 the browser 154 receives a network page 136 representing the requested page content. At box 509 the rendering code 142 parses the network page 136 to locate the initial portion of the requested content, then renders the initial portion in a visible portion of the browser 154. Next, at box 512 the rendering code 142 parses the same network page 136 to locate the partial results for the predicted network page, then renders the partial results in a hidden portion of the browser 154.

At box 515, the browser 154 receives a user request to view another network page, as a result of the user interacting with objects or links on the displayed network page 136. In this scenario, the request at box 515 corresponds to the predicted page of box 512. Operation when the user selects a network page other than the one predicted was described earlier in connection with FIG. 4, although it is not shown in FIG. 5.

At box 518, the rendering code 142 parses the current network page 136 to determine whether partial predicted page content is present and usable. For example, predicted page content may not have been provided by the network page generation application 115, or predicted content may have been provided but with an indication that the prediction is not usable (e.g., is stale or does not correspond to the selection made by the user).

If the rendering code determines at box 518 that the partial predicted page content is not present or is not usable, then handling of this particular user interaction is complete. The process of FIG. 5 then starts again to handle another network request from the user.

If the rendering code determines at box 518 that the partial predicted page content is present and is usable, then at box 521 the rendering code 142 re-renders the previously received partial page content, this time in the visible portion of the browser 154. At box 524, the browser 154 requests and receives the user-requested network page 136. At box 527, the rendering code 142 parses the newly received network page 136 to locate the remainder of the page content for the predicted page, then renders the remainder of the page content in the visible portion of the browser 154. At this point, all the content for the newly requested network page is visible, both the pre-loaded partial results and the just received remainder. The process of FIG. 5 is then complete.

As described above, the user does not see the partial page content until the user action views the predicted network page 136. The browser embodiment described in connection with FIG. 5 accomplished this by rendering the partial predicted page content in a hidden portion of the browser window. Other browser embodiments accomplish this by locally storing the partial predicted page content when it is returned from the computing device 103, but delaying the display of the partial predicted page content until a user action causes the predicted network page 136 to be accessed.

Figure 6:
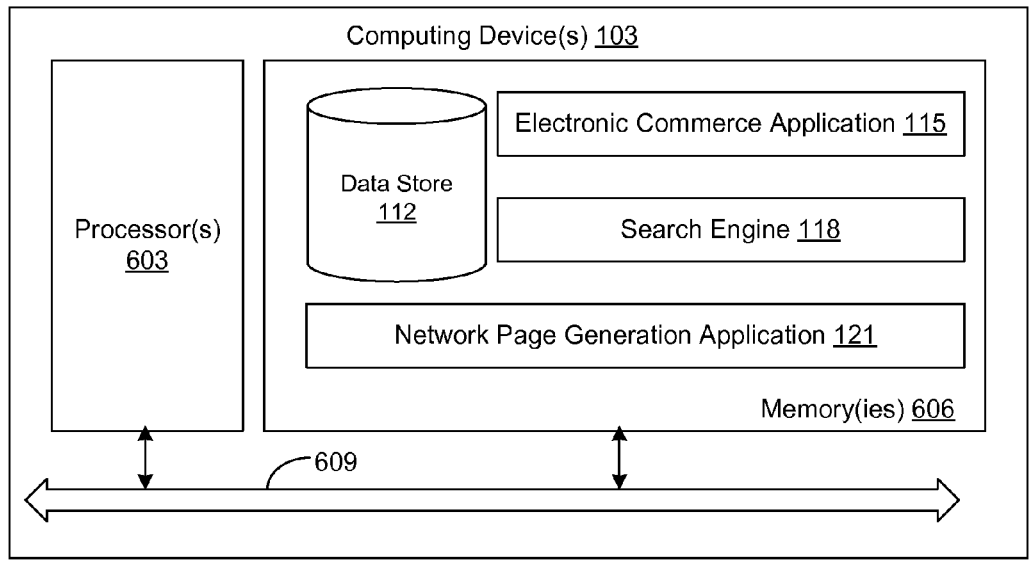
FIG. 6 is a schematic block diagram that provides one example illustration of a computing device employed in the networked environment of FIG. 1 according to various embodiments of the present disclosure.

Moving on to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the network page generation application 115, the search engine 118, the electronic commerce application 121, the navigation-based prediction engine 151, and potentially other applications. Also stored in the memory 606 may be a data store 112 and other data. In addition, an operating system may be stored in the memory 606 and executable by the processor 603.

Figure 7:
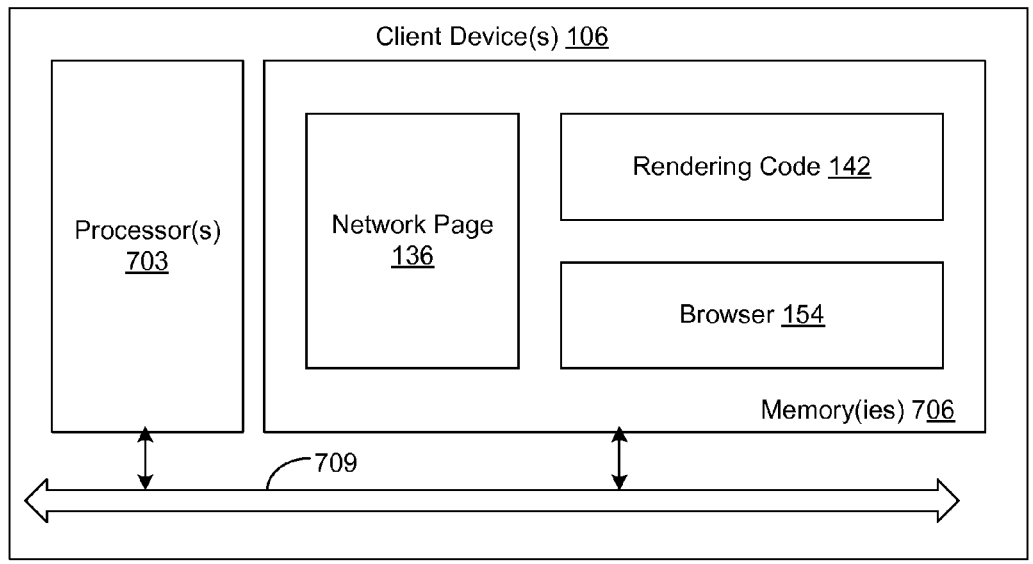
FIG. 7 is a schematic block diagram that provides one example illustration of a client device employed in the networked environment of FIG. 1 according to various embodiments of the present disclosure.

Turning now to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 609 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the browser 154, the rendering code 142, and potentially other applications. In addition, an operating system may be stored in the memory 706 and executable by the processor 703.

It is understood that there may be other applications that are stored in the memory 606, 706 and are executable by the processor 603, 703, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors and the memory 606, 706 may represent multiple memories that operate in parallel processing circuits, respectively. In such a case, the local interface 609, 709 may be an appropriate network 109 (FIG. 1) that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the network page generation application 115, the search engine 118, the electronic commerce application 121, the navigation-based prediction engine 151, the browser 154, the rendering code 142, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-5 show the functionality and operation of an implementation of portions of the network page generation application 115 and the browser 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in flowcharts of FIGS. 4-5 may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115, the search engine 118, the electronic commerce application 121, the navigation-based prediction engine 151, the browser 154, and rendering code 142, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    obtaining, in a computing device, page content corresponding to a network request received from a client device via a network;
    calculating, in the computing device, after the obtaining, based at least in part on probability of selection data, a probability of selection for a predicted network page associated with the page content;
    determining, in the computing device, if the probability of selection meets a predetermined confidence threshold;
    in response to the network request, if the probability of selection meets the predetermined confidence threshold, generating a first network page that includes the page content corresponding to the network request and a portion of content for the predicted network page, and providing the first network page;
    receiving a request for another network page;
    if the another network page in the request corresponds to the predicted network page, generating a second network page that includes a remainder of the content for the predicted network page excluding the portion of content for the predicted network page; and
    wherein the probability of selection data is aggregated across a plurality of users, at least one of the users being distinct from a one of the users from which the network request was obtained.

2. The method of claim 1, wherein the probability of selection data is based at least in part on page view data indicating transitions by the users between pages of a network site.

3. The method of claim 1, wherein the probability of selection data includes probabilities for one of the users viewing one page in a multi-page search result after viewing other pages in the multi-page search result.

4. The method of claim 1, further comprising:
    if the probability of selection fails to meet the predetermined threshold, then generating a third network page that includes the page content corresponding to the network request but without the portion of the predicted network page.

5. The method of claim 1, further comprising:
if the another network page in the request does not correspond to the predicted network page, generating a fourth network page that includes content for the another page in the request.

6. The method of claim 1, further comprising:
receiving the network request from a browser; and
providing the first network page in response to the network request.

7. The method of claim 1, further comprising:
receiving the request for the another network page from a browser; and
providing the second network page to the browser in response to the request.

8. The method of claim 1, wherein the probability of selection data indicates at least one probability of at least one corresponding action occurring with respect to the page content.

9. The method of claim 8, wherein the at least one corresponding action comprises a selection of an object or a link included in the page content.

10. The method of claim 1, wherein the probability of selection data is based at least in part on at least one previous search query or at least one previous page view.

11. A system, comprising:
at least one computing device;
an application implemented in the at least one computing device, comprising:
logic that obtains page content corresponding to a network request received from a client device via a network;
logic that calculates, after obtaining the page content, based at least in part on probability of selection data, a probability of selection for a predicted network page associated with the page content;
logic that determines if the probability of selection meets a predetermined confidence threshold;
logic that generates, in response to the network request, if the probability of selection meets the predetermined confidence threshold, a first network page that includes the page content corresponding to the network request and a portion of content for the predicted network page, and providing the first network page;
logic that receives a request for another network page;
logic that, if the another network page in the request corresponds to the predicted network page, generates a second network page that includes a remainder of the content for the predicted network page excluding the portion of content for the predicted network page; and
wherein the probability of selection data is aggregated across a plurality of users, at least one of the users being distinct from a one of the users from which the network request was obtained.

12. The system of claim 11, wherein the probability of selection data is based at least in part on page view data indicating transitions by the users between pages of a network site.

13. The system of claim 11, wherein the probability of selection data includes probabilities for one of the users viewing one page in a multi-page search result after viewing other pages in the multi-page search result.

14. The system of claim 11, wherein the application further comprises logic that, if the probability of selection fails to meet the predetermined threshold, generates a third network page that includes the page content corresponding to the network request but without the portion of the predicted network page.

15. The system of claim 11, wherein the application further comprises logic that, if the another network page in the request does not correspond to the predicted network page, generates a fourth network page that includes content for the another page in the request.

16. The system of claim 11, wherein the application further comprises:
logic that receives the network request from a browser; and
logic that provides the first network page in response to the network request.

17. The system of claim 11, wherein the application further comprises:
logic that receives the request for the another network page from a browser; and
logic that provides the second network page to the browser in response to the request.

18. A non-transitory computer-readable medium embodying a program executable in a computing device, the program comprising:
code that obtains page content corresponding to a network request received from a client device via a network;
code that calculates, after obtaining the page content, based at least in part on probability of selection data, a probability of selection for a predicted network page associated with the page content;
code that determines if the probability of selection meets a predetermined confidence threshold;
code that, in response to the network request, if the probability of selection meets the predetermined confidence threshold, generates a first network page that includes the page content corresponding to the network request and a portion of content for the predicted network page, and providing the first network page;
code that receives a request for another network page;
code that, if the another network page in the request corresponds to the predicted network page, generates a second network page that includes a remainder of the content for the predicted network page excluding the portion of content for the predicted network page; and
wherein the probability of selection data is aggregated across a plurality of users, at least one of the users being distinct from a one of the users from which the network request was obtained.

19. The non-transitory computer-readable medium of claim 18, wherein the probability of selection data is based at least in part on page view data indicating transitions by the users between pages of a network site.

20. The non-transitory computer-readable medium of claim 18, wherein the probability of selection data includes probabilities for one of the users viewing one page in a multi-page search result after viewing other pages in the multi-page search result.

21. The non-transitory computer-readable medium of claim 18, the program further comprising:
code that, if the probability of selection fails to meet the predetermined threshold, generates a third network page that includes the page content corresponding to the network request but without the portion of the predicted network page.

\* \* \* \* \*